United States Patent [19]

Buchschmid et al.

[11] 4,435,625
[45] Mar. 6, 1984

[54] PNEUMATICALLY OPERABLE SWITCH UNIT FOR MONITORING TIRE PRESSURE

[75] Inventors: Emil Buchschmid, Rosstal, Fed. Rep. of Germany; Rainer Burkel, Le Chesnay; Jean Danamps, Asnieres, both of France; Anton Frenznick, Nuremberg; Günther Stradtmann, Ansbach, both of Fed. Rep. of Germany

[73] Assignee: Robert Bosch GmbH, Stuttgart, Fed. Rep. of Germany

[21] Appl. No.: 353,966

[22] Filed: Mar. 2, 1982

[30] Foreign Application Priority Data

Mar. 10, 1981 [DE] Fed. Rep. of Germany ....... 3108998

[51] Int. Cl.³ .............................................. H01H 35/00
[52] U.S. Cl. ................................ 200/61.22; 200/61.25
[58] Field of Search ............... 200/61.22, 61.25, 83 N, 200/83 Q

[56] References Cited

U.S. PATENT DOCUMENTS

| 3,602,884 | 8/1971 | Brumbelow | 200/61.22 X |
|---|---|---|---|
| 3,787,806 | 1/1974 | Church | 200/61.22 X |
| 3,961,309 | 6/1976 | Eddy | 200/61.25 |
| 3,985,984 | 10/1976 | Cappa | 200/61.25 X |
| 4,148,008 | 4/1979 | Lusk et al. | 200/61.25 X |
| 4,180,795 | 12/1979 | Matsuda et al. | 200/61.25 X |
| 4,292,484 | 9/1981 | Pruss | 200/61.25 |
| 4,350,854 | 9/1982 | Matsuda et al. | 200/61.25 X |

FOREIGN PATENT DOCUMENTS 2540353  3/1977  Fed. Rep. of Germany .
2832447  2/1980  Fed. Rep. of Germany .

Primary Examiner—J. R. Scott
Attorney, Agent, or Firm—Frishauf, Holtz, Goodman & Woodward

[57] ABSTRACT

An insulating cup-shaped body (29) that is screwed into the rim (11) of a vehicle wheel prevents conduction of heat (generated by the brakes, for example) from heating the metallic body (16) that forms a reference pressure chamber closed off by a membrane (17) from the inflated interior of a vehicle tire. The membrane (17) is set slightly within the rim of the cup for protection during tire changes. The chamber and switch housing (16) and a spool (27) for the coil of a resonant circuit form a preassembled unit that is snapped into the insulating cup and cemented into place. The relatively large coil diameter adds to the economy of the device, permitting the use of a small capacitor. The temperature of the gas sealed in the reference pressure chamber (18) by closure of the filling bore with a steel ball (25) follows the temperature of the interior of the tire and reliably opens the resonant circuit if the tire pressure falls below a prescribed limit. The condition of the resonant circuit is sensed by a fixed miniature oscillator mounted on the axle.

7 Claims, 2 Drawing Figures

U.S. Patent    Mar. 6, 1984    4,435,625
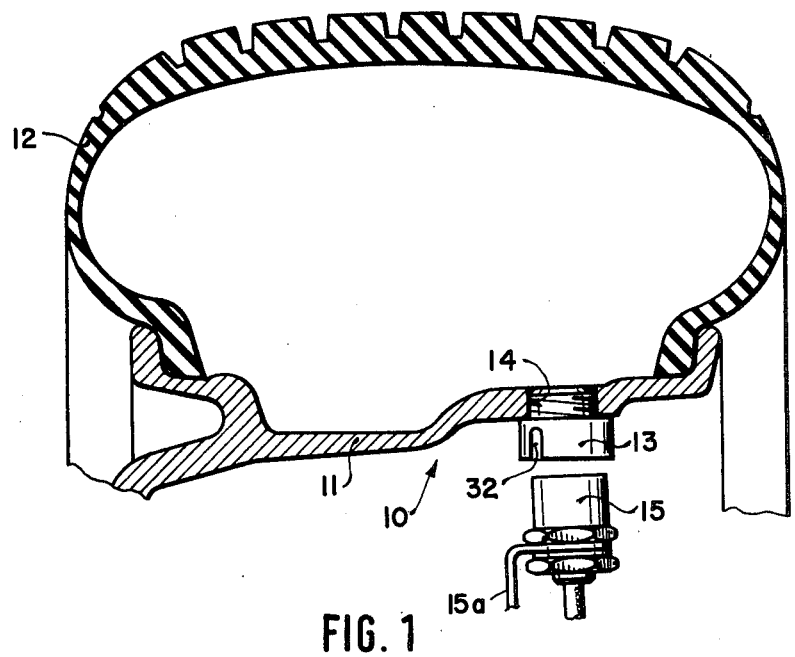
FIG. 1
FIG. 2
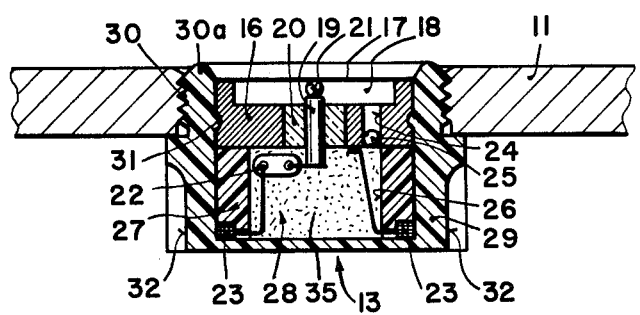

PNEUMATICALLY OPERABLE SWITCH UNIT FOR MONITORING TIRE PRESSURE

BACKGROUND OF THE INVENTION

1. Field of the Invention

This invention concerns vehicle tire pressure monitors for setting in the rim of a wheel equipped with a tubeless tire, in which a switch is operated when the tire pressure falls too low, changing the character of an electrical circuit contained in the unit so that the changed condition of the switch may be detected by a sensor fixed on the vehicle so that it does not rotate with the wheel and connected in an alarm circuit.

2. Description of the Prior Art

In a known pneumatic switch unit of the above-described type, described in DE-OS No. 28 32 447, a metallic switch housing which is externally threaded and is screwed into a correspondingly tapped bore in the wheel rim defines a reference pressure chamber. That chamber is closed off on the side facing the interior of the tubeless tire by a metallic membrane against which a switch contact makes contact. The pressure in the reference pressure chamber is so set that, for a satisfactory pressure in the tire, the membrane making contact with the switch contact closes a circuit for induced electric current. When the air pressure in the tire is too low, the gas in the reference pressure chamber presses the membrane towards the interior of the tire until the electric circuit is interrupted. The circuit connected to this switch is constituted as a resonant circuit, so that the tire pressure can be monitored by an alarm circuit that is wirelessly coupled to the resonant circuit once in every revolution of the wheel.

Although in this known switch unit the gas temperature in the reference pressure chamber adjusts itself to the air temperature in the tire, it can happen that, by heat radiation from, and heat conduction through, the rim to the metallic switch housing, the temperature in the reference pressure chamber can become higher than the air temperature in the tire, as may happen in prolonged operation of the brake. In such a case, the electrical circuit is opened and a false signal is provided to the alarm circuit.

SUMMARY OF THE INVENTION

It is an object of the present invention to provide a pneumatically operated switch unit with built-in resonant circuit for monitoring pressure in a vehicle tire which will be more reliable in operation and less subject to heating of the gas in the reference chamber above the temperature of the air in the tire being monitored.

Briefly, the unit is inserted and held in a capsule or cup of an insulating material that is resistant to temperature gradients and temperature changes, to reduce heat conduction from the rim. The insulating cup is externally threaded near its open end for insertion through the tire rim, and the rim edge of the cup extends slightly beyond the membrane of the reference pressure chamber in order to provide protection for it during tire changes. The pneumatic switch unit of the invention has the advantage that the metallic housing for the reference pressure chamber cannot be heated either by heat radiation from the outside or by heat conduction through the rim of the vehicle because of the interposition of the insulating cup. In consequence, the temperature in the reference pressure chamber conforms better to the air temperature in the vehicle tire. There is the further advantage that the switch housing can be made substantially smaller and lighter, so that on the one hand the temperature conformance is facilitated and, on the other hand, there is less unbalancing of the wheel that needs to be compensated in the usual way. Furthermore, the individual parts of the switch unit can be relatively simply manufactured and assembled because of the improved functional precision. The external threading of the insulating cup assures that the switch casing will not project inwardly beyond the rim and also that leakage space between the switch casing and the insulating cup cannot lead to a fall in tire pressure. The slight projection of the cup rim beyond the membrane makes it unnecessary to provide an aperture disk to cover it, as was done in the past in order to protect the membrane from damage during tire changing.

A particular simplification of the production of the pressure switch unit can be achieved by closing off the fill opening of the reference pressure chamber in the switch housing by pressing a steel ball gas-tight in the opening.

BRIEF DESCRIPTION OF THE DRAWING

The invention is further described by way of illustrative example with reference to the annexed drawing, in which:

FIG. 1 is a cross-section of the rim portion of a vehicle wheel showing a tire mounted thereon, a pressure switch unit and the detector element of an alarm system on a fixed bracket only part of which is shown, and FIG. 2 is a cross-section of the pneumatically operated switch unit in the ON state, on an enlarged scale.

DESCRIPTION OF THE ILLUSTRATED PREFERRED EMBODIMENT

The rim portion 11 of a vehicle wheel 10, shown in FIG. 1 in cross-section, has a tire 12 mounted thereon, which is shown in the inflated condition. The air pressure in the tire 12 is to be monitored by a pneumatically operable switch 13 that is screwed into a tapped bore 14 of the rim 11. The pressure switch 13 cooperates with a high-frequency generator 15, the operating conditions of which will change when a circuit resonant to its operating frequency is brought near it, thus providing a response by which the presence of such a resonant circuit can be detected. A common high-frequency generating circuit of that type is known in the art as a "grid-dip" oscillator, named after its precursor in the technology that preceded the discovery of the transistor. The high-frequency generator 15 is fixedly mounted by the bracket 15a on the axle (not shown). As the pressure switch unit 13 revolves with the wheel, it passes the high-frequency generator 15 once every revolution of the wheel 10 and comes into wireless coupling therewith, at which time the high-frequency generator 15 senses the condition of the pressure switch 13.

FIG. 2 shows the cross-section of the pressure switch unit 13 which has an inner metallic switch housing 16. The latter supports at its front end an electrically conducting membrane 17 that is fastened to the housing 16 by a ring weld. A reference pressure chamber 18 is machined in the front of the switch housing 16 and is closed off from the tire interior by the membrane 17. A contact rod 19 is seated in the reference pressure chamber. The rod 19 is fusion-sealed in a pressure-tight glass bushing seal 20 which insulates it from the switch casing 16 and allows its external end to project out of the housing 16. The contact rod 19 carries a contact bead 21 at its forward end that works against a contact surface of the membrane 17. When there is sufficient air pressure in the tire 12, the contact surface of the membrane 17 lies against the contact bead 21, but when the air pressure falls below a prescribed value, the membrane 17 lifts off the contact bead 21 and opens an electrical circuit. In that circuit are a capacitor 22 and a coil 23 that are connected together to form a resonant circuit that is connected on one side with the contact rod 19 and on the other side, through the metallic housing 16 to the membrane 17.

Before installation the reference pressure chamber 18 is filled with a gas through the bore 24 in the housing 16. This gas is brought to the required pressure during filling and then the bore 24 is hermetically closed by a steel ball 25 of slightly larger diameter that is pressed into the bore 24 and thereby cold-welded in place.

The capacitor 22 of the resonant circuit is located in the interior space 26 of a hollow cylinder 27 that constitutes a spool at the lower end of which the coil 23 of the resonant circuit is mounted. The hollow cylinder or spool 27 is illustrated in FIG. 2 when the pressure switch unit 13 is mounted in the vehicle tire rim 11. The cylindrical spool 27 is united with the switch housing 16 to form a unit 28 having the same external diameter overall. The electrical connections between the capacitor 22, the coil 23 and the contact rod 19 and the switch housing 16 also lie within the spool 27. The spool interior 26 is filled with a suitable filler material 35, such as plastic foam, for fixing the location of the capacitor 22 and of the electrical connections.

The gas pressure prevailing in the reference pressure chamber 18 determines what air pressure in the tire 12 is necessary for closing the resonant circuit through the membrane 17. If the tire pressure falls below a certain limit value, the membrane 17 is lifted off the contact rod 19 by the pressure in the reference chamber, opening the resonant circuit and causing the high-frequency generator 15 to produce an alarm at the next pass-by. Since both the tire pressure and the pressure in the reference chamber 18 change under the influence of the temperature in the tire interior, fluctuations of the air pressure in the tire 12 caused by temperature are desirably not detected by the switch unit 13.

In order to prevent the temperature in the reference pressure chamber 18 from being influenced by heat radiation or heat conduction from the outside, the switch casing 16, as well as the resonant circuit including the capacitor 22 and the coil 23, are fixed within a temperature resistant insulating cup 29 that is open towards the tire interior. The insulating cup 29 at its front or rim end has external threads 30 at a position surrounding the switch casing 16 and can be screwed into the tapped bore 14 of the wheel rim 11 to secure the switch unit 13 in position. The threaded end 30 of the insulating cup 29 extends its rim 30a beyond the plane of the membrane 17, so that the membrane 17 will be protected by the threaded end of the cup during a change of tires. The preassembled cylindrical component 28 consisting of the switch casing 16 and the spool 27 and their respective contacts is pressed into the insulating cup 29 and bonded in position by adhesive. An annular bead 31, shown enlarged out of scale in FIG. 2, is provided on the interior of the insulating cup 29 in its upper region, so that the switch housing 16, provided with a small mating groove, can be snapped into position by pressure. The insulating cup 29, moreover, is provided with two oppositely located external grooves 32 running in the axial direction, so that a tool can be inserted in them to screw the insulating cup 29 in the tapped bore 14 of the rim 11 tightly enough to produce a gas-tight closure.

With a pressure switch unit of the present invention, as compared with known pressure switch units for tire pressure monitoring, the temperature in the reference pressure chamber can follow the temperature within the tire better, because the pressure chamber walls are now better insulated from the rim while the pressure chamber is directly connected thermally with the tire interior through the membrane which conducts heat easily. Furthermore, the weight of the switch unit can be kept small, while at the same time easily manufactured parts can be used to make the device. The relatively large diameter of the coil 23 in the device of the present invention also reduces costs, since it enables the resonant circuit to be constituted with a relatively smaller and more economical capacitor.

Although the invention has been described with reference to a particular illustrative embodiment, it will be recognized that variations and modifications are possible within the inventive concept.

We claim:

1. A pneumatically operated switch unit for monitoring vehicle tire pressure comprising a metallic conducting switch housing (16) capable of being inserted into a bore in a vehicle tire rim, an electrically conducting membrane (17) with the periphery thereof fastened to said switch housing on the side of said switch housing facing into the tire interior, said membrane closing off a gas-filled reference pressure chamber of said switch housing into which chamber there extends a switch contact insulatedly mounted in said switch housing, by pass-through insulation means, in such a position that it makes contact with said membrane when gas pressure in said chamber is at a reference pressure value and the air pressure in said tire exceeds a predetermined threshold value and is put out of contact with said membrane when the pressure in said tire falls below said threshold value, and circuit elements constituting a resonant circuit with said switch contact when the latter is in contact with said membrane, said switch unit also incorporating the improvement which comprises the provision of:

a cup-shaped shell (29) of insulating material capable of withstanding temperature changes and gradients, externally threaded for being screwed into said bore in said tire rim with its open end facing the interior space of said tire, and within which said metallic switch housing (16) and said resonant circuit (22,23) are firmly secured, said metallic switch housing (16) electrically connecting said conducting membrane (17) with said resonant circuit elements and being held within said cup-shaped shell (29) in a position in which said metallic switch housing (16) and said conducting membrane (17) do not project beyond said bore into said tire interior.

2. A pneumatically operated switch unit as defined in claim 1, in which the rim of said cup-shaped shell (29) of insulating material extends beyond said membrane (17) towards said tire interior.

3. A pneumatically operated switch unit for monitoring vehicle tire pressure comprising a metallic switch housing capable of being inserted into a bore in a vehicle tire rim, an electrically conducting membrane with a ring-shaped fastening to said switch housing on the side of said housing facing into the tire interior, said membrane closing off a gas-filled reference pressure chamber of said switch housing into which chamber there extends a switch contact insulatedly mounted in said housing, by pass-through insulation means, in such a position that it makes contact with said membrane when gas pressure in said chamber is at a reference pressure value and the air pressure in said tire exceeds a predetermined threshold value and is put out of contact with said membrane when the pressure in said tire falls below said threshold value, and circuit elements constituting a resonant circuit with said switch contact when the latter is in contact with said membrane, said switch unit also incorporating the improvement which comprises the provision of:

- a cup-shaped shell (29) of insulating material capable of withstanding temperature changes and gradients, externally threaded for being screwed into said bore in said tire rim with its open end facing the interior space of said tire, and within which said switch housing and said resonant circuit (22,23) are firmly secured, and
- a hollow cylindrical body (27) within said cup-shaped shell, serving as a spool on which a coil (23) forming part of said resonant circuit is mounted, said resonant circuit also including a capacitor (22) located inside said cylindrical body (27) and connected between said coil and said switch contact.

4. A pneumatically operated switch unit as defined in claim 3, in which said switch housing and said cylindrical body are bonded together and form a cylindrical unit of constant outer diameter fitting the innter diameter of said cup-shaped shell capable of being preassembled for insertion in said cup.

5. A pneumatically operated switch unit as defined in claim 4, in which said cylindrical unit (28) is bonded by adhesive to said cup-shaped shell (29).

6. A penumatically operated switch unit as defined in claim 4, in which said cup-shaped shell (29) is provided with an internal bead (31) in its upper portion, and said switch housing (16) is provided with an internal groove, whereby said cylindrical unit can be pressed and snapped into position in said cup-shaped shell.

7. A pneumatically operated switch unit for monitoring vehicle tire pressure comprising a switch housing capable of being inserted into a bore in a vehicle tire rim, an electrically conducting membrane with a ring-shaped fastening to said switch housing on the side of said housing facing into the tire interior, said membrane closing off a gas-filled reference pressure chamber of said switch housing into which chamber there extends a switch contact insulatedly mounted in said housing, by pass-through insulation means, in such a position that it makes contact with said membrane when gas pressure in said chamber is at a reference pressure value and the air pressure in said tire exceeds a predetermined threshold value and is put out of contact with said membrane when the pressure in said tire falls below said threshold value, and circuit elements constituting a resonant circuit with said switch contact when the latter is in contact with said membrane, said switch unit also incorporating the improvement which comprises the provision of:

- a cup-shaped shell (29) of insulating material capable of withstanding temperature changes and gradients, externally threaded for being screwed into said bore in said tire rim with its open end facing the interior space of said tire, and with in which said switch housing and said resonant circuit (22,23) are firmly secured,
- said reference pressure chamber (18) being provided with a fill channel (24) bored through said switch housing (16) and equipped with a metal ball closure element (25), pressed into said channel to close it to maintain the gas filling of said chamber at the reference pressure.

* * * * *